United States Patent [19]
Yamasaki

[11] Patent Number: 4,593,312
[45] Date of Patent: Jun. 3, 1986

[54] EMISSION CONTROLLER FOR ELECTRONIC FLASH ASSOCIATED WITH AN ELECTRONIC CAMERA

[75] Inventor: Masafumi Yamasaki, Hachioji, Japan

[73] Assignee: Olympus Optical Company, Ltd., Japan

[21] Appl. No.: 528,163

[22] Filed: Aug. 31, 1983

[30] Foreign Application Priority Data

Oct. 27, 1982 [JP] Japan .................... 57-188532

[51] Int. Cl.⁴ .................................. H04N 3/14
[52] U.S. Cl. .................................. 358/909; 358/213
[58] Field of Search ............. 358/211, 213, 217, 225, 358/212, 209, 310, 909; 354/129, 139, 149.1, 149.11, 147, 413, 416, 422, 444

[56] References Cited

U.S. PATENT DOCUMENTS

| | | | |
|---|---|---|---|
| 3,934,161 | 1/1976 | Caywood | 358/213 |
| 4,366,501 | 12/1982 | Tsunekawa et al. | 358/310 |
| 4,453,182 | 6/1984 | Wilkinson et al. | 358/217 |

FOREIGN PATENT DOCUMENTS

126994 10/1979 Japan.

*Primary Examiner*—Gene Z. Rubinson
*Assistant Examiner*—Stephen Brinich
*Attorney, Agent, or Firm*—Ostrolenk, Faber, Gerb & Soffen

[57] ABSTRACT

An emission controller for an electronic flash associated with an electronic camera including a solid state pickup element is provided. In response to the closure of a flash photography mode switch which conditions an electronic flash for emission of flashlight, all photodiodes of the solid state pickup element which define the picture elements are uniformly initialized. Subsequently, in response to the closure of an emission initiate switch which initiates the emission of flashlight from an electronic flash, the photodiodes are reset or freed from the initialized condition, and the solid state pickup element begins to be scanned to thereby read out the picture elements at a given time delay after the emission of flashlight from the electronic flash.

16 Claims, 9 Drawing Figures

EMISSION CONTROLLER FOR ELECTRONIC FLASH ASSOCIATED WITH AN ELECTRONIC CAMERA

BACKGROUND OF THE INVENTION

The present invention relates to an emission controller for an electronic flash associated with an electronic camera which includes a solid state pickup element (solid state image sensor), and more particularly, to such emission controller which enables an image to be obtained which is synchronized with the emission of flashlight from an electronic flash.

When using an electronic flash including a solid state pickup element, it has been difficult to take a picture of an instantaneously moving object in synchronism with such movement while utilizing an electronic flash. By way of example, when a scanning takes place according to an NTSC (National Television System Committee) scheme to read intermediate picture elements from the solid state element, and an electronic flash is triggered to emit flashlight, it will be seen that the resulting picture will be distorted in terms of the amount of light incident thereon since the duration of the emission from the electronic flash is on the order of several milliseconds at most. In other words, if the emission of flashlight is initiated from the electronic flash independently of a vertical sync signal, a video signal will contain pseudo-signals, which causes bright lines to appear across the image.

To compensate for this, there has been proposed an emission controller for an electronic flash for use with an electronic camera in which the electronic flash is triggered in synchronism with a vertical sync signal so that the emission of flashlight takes place within a vertical blanking period. Specifically, the controller operates to initiate the emission of flashlight from the electronic flash in response to a logical product of a flash trigger signal and a vertical sync signal. However, it will be seen that with such conventional arrangement, the emission of flashlight from the electronic flash may occur with a time delay up to a maximum of the period of one frame, which is about 30 milliseconds in the NTSC system, after a trigger switch associated with the electronic flash has been closed, since the emission is not initiated if the trigger switch is closed until the vertical sync signal occurs. As a result of this time delay, the chance to take a picture of an object being photographed which moves instantaneously may be missed.

SUMMARY OF THE INVENTION

In view of the foregoing, it is an object of the invention to provide an emission controller for an electronic flash associated with an electronic camera including a solid state pickup element, in which all elements which individually produce picture elements are initialized in response to the selection of a flash photography mode and are reset in response to a flash trigger signal, thereby allowing a sequential scan to be initiated after a short time delay from the initiation of emission of flashlight from the electronic flash.

In accordance with the invention, the solid state pickup element of the electronic camera begins to be read by a sequential scanning a given short time delay after the emission of flashlight from the electronic flash. In this manner, it becomes possible to produce an image which is synchronized with the emission of flashlight, thus providing the capability that a still image of an object being photographed which instantaneously moves can be reliably photographed.

DESCRIPTION OF PREFERRED EMBODIMENT

Figure 1:
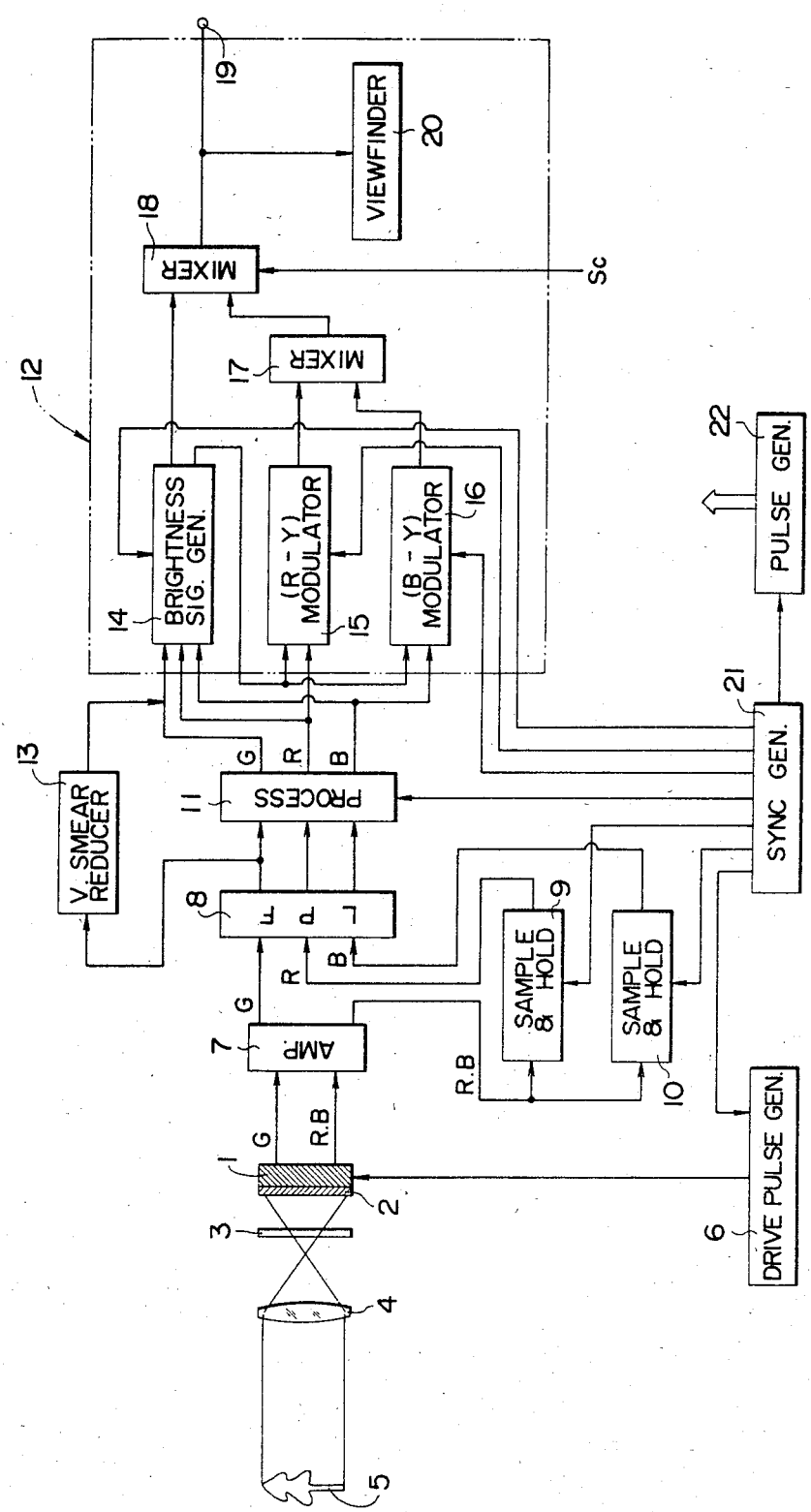
FIG. 1 is a block diagram of an electronic camera including a solid state pickup element in which an emission controller for an electronic flash according to the invention is incorporated.

Referring to FIG. 1, there is shown an electronic camera including a solid state pickup element 1 having a light receiving surface, on which is disposed a color separation filter 2 of color mosaic configuration which divides the light receiving surface into three colors of red, blue and green. An infrared cut-off filter 3 is disposed in front of the color separation filter 2. Accordingly, when a taking lens 4 focusses an optical image of an object 5 being photographed onto the light receiving surface of the solid state pickup element 1, the infrared component of the light from the object is eliminated by the filter 3 and the remainder of the light transmits through the color separation filter 2 to impinge upon individual photoelectric transducer elements of the solid state pickup element 1, each of which defines a picture element. The solid state pickup element 1 is scanned by drive pulses produced by a drive pulse generator 6, whereby each picture element signal from the individual transducer element is read as a color signal. The color signals are grouped into a green (G), a red (R), and a blue (B) signal, which are applied to an amplifier 7 for amplification. The G signal is directly introduced into a low pass filter 8 while the R and the B signal are passed through sample-and-hold circuits 9, 10, respectively, before they are introduced into the low pass filter 8 where they form a continuous signal. Subsequently, the G, R, and B signals are applied to a processing circuit 11, which performs a gamma correction, a black level clip, a white level clip function, and are then fed to a color encoder 12. It will be seen that a vertical smear reducing circuit 13 is connected across the input and the output terminal of the processing circuit 11 for the path of the green signal, and functions to reduce noises which may be mixed into a vertical signal path as a result of the diffusion of carriers produced by light which impinges upon a deep portion of a substrate and other regions than photodiodes of the solid state pickup element 1.

In the color encoder 12, the individual color signals G, R and B are applied to a brightness signal generator 14 which synthesizes a brightness (Y) signal. The brightness signal Y is fed to an (R−Y) modulator 15 together with the R signal which is output from the red signal path of the processing circuit 11, thus modulating a subcarrier. The Y signal is also fed to a (B−Y) modulator 16 together with the B signal which is output from the blue signal path of the processing circuit 11, thus modulating a subcarrier. Color difference outputs from the (R−Y) and (B−Y) modulators 15, 16 are fed to a mixer 17 for mixing, thus producing a color subcarrier signal. The color subcarrier signal and the Y signal are mixed in a mixer 18, to which a color sync signal Sc is applied, thus synthesizing a color video signal of NTSC system. The color video signal is derived as a print output at an output terminal 19, and is also applied to an electronic viewfinder 20, which displays an object being photographed. A sync signal generator 21 delivers sync signals to a variety of circuits including the drive pulse generator 6, the sample-and-hold circuits 9, 10, the processing circuit 11, the brightness signal generator 14, the (R−Y) and (B−Y) modulators 15, 16 and a pulse generator 22 which produces a variety of pulses.

Figure 2:
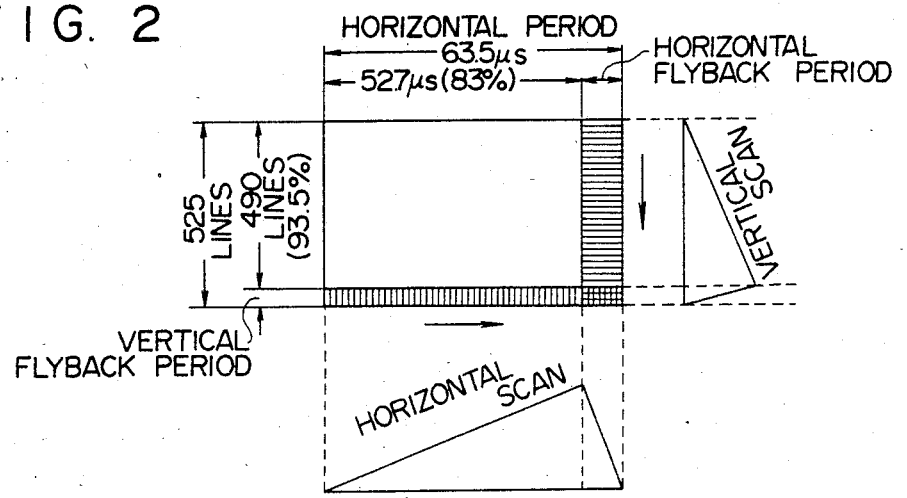
FIG. 2 is a diagram showing the relationship between the scan period and a flyback period according to the NTSC system.

The electronic camera described above employs the NTSC system. Accordingly, a scanning of picture elements across the light receiving surface of the solid state pickup element 1 takes place in a manner to maintain the relationship between the scan period and the flyback period according to the NTSC system, as shown in FIG. 2. Specifically, the horizontal scan period has a duration of 63.5 $\mu$S, of which 10.8 $\mu$S represents a horizontal flyback period. Accordingly, 83% of the horizontal scan period or 52.7 $\mu$S is used to provide an actual display on the screen. The number of horizontal scan lines is equal to 525, of which 35 lines belong to the vertical flyback period, and hence 93.5% or 490 lines are used to produce an actual display on the screen. As a consequence, the solid state pickup element is scanned by using a horizontal scan frequency of 15.73 kHz, a field scan (vertical scan) frequency of 60 Hz and a frame scan frequency of 30 Hz.

Figure 3:
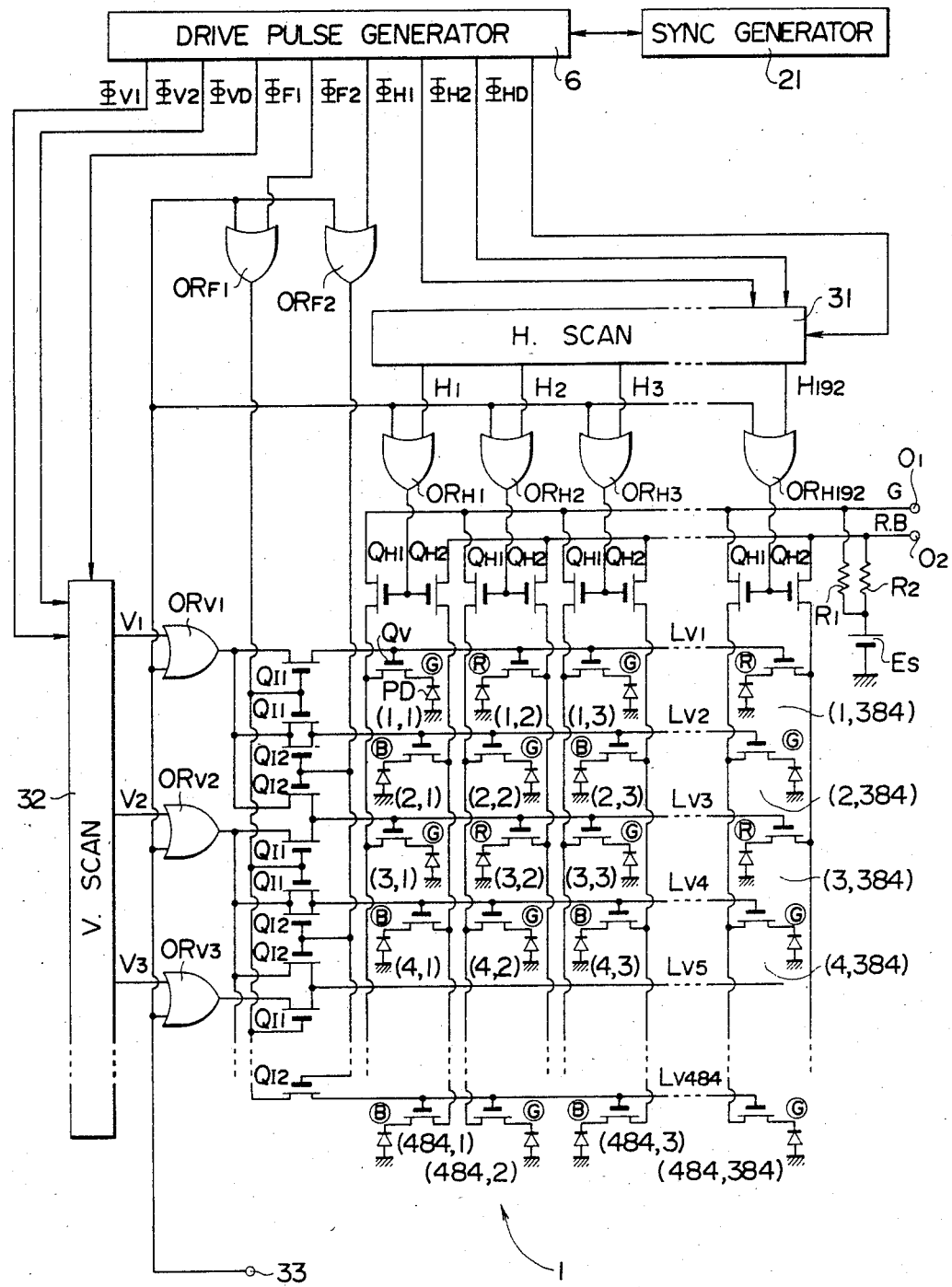
FIG. 3 is a circuit diagram of the solid state pickup element which is controlled by the emission controller of the invention.

FIG. 3 is a circuit diagram of the solid state pickup element 1 which is controlled by the emission controller for electronic flash according to the invention. The solid state pickup element 1 is of MOS type and includes an array of photodiodes PD defined on the light receiving surface thereof which correspond to 484×384 picture elements. These elements include green elements Ⓖ disposed in a chequered pattern, red elements Ⓡ disposed therebetween on odd-numbered rows, and blue Ⓑ disposed between the green elements on even-numbered rows. Each of the photodiodes PD has its anode connected to the ground and its cathode connected alternately to one of a pair of horizontal switching MOS-FET $Q_{H1}$, $Q_{H2}$ through a vertical switching MOS-FET $Q_V$, it being noted that a pair of switching transistors $Q_{H1}$ and $Q_{H2}$ is associated with each column. It will be seen that the horizontal switching MOS-FET $Q_{H1}$ provides a switching action upon green elements Ⓖ, and is connected to a color signal output terminal $O_1$. The horizontal switching MOS-FET $Q_{H2}$ provide a switching action upon red elements Ⓡ and blue element Ⓑ, and is connected to a color signal output terminal $O_2$. The terminals $O_1$, $O_2$, are connected through load resistors $R_1$, $R_2$, respectively, to the positive terminal of a target source Es, the negative terminal of which is connected to the ground. The horizontal switching transistors $Q_{H1}$, $Q_{H2}$ in each column have their gates connected in common and connected to the output of each of OR gates $OR_{H1}$, $OR_{H2}$, ... which are connected to outputs of a horizontal scan circuit 31. The vertical switching transistors $Q_V$ on each row have their gates connected in common and connected to one of vertical column select lines $L_{V1}$, $L_{V2}$, ..., which are in turn connected through interlace switching MOS-FET $Q_{I1}$, $Q_{I2}$, respectively, to the outputs of OR gates $OR_{V1}$, $OR_{V2}$, ... which are in turn connected to outputs of a vertical scan circuit 32. The interlace switching transistors $Q_{I1}$ have their gates connected in common and connected to the output of an OR gate $OR_{F1}$ while the interlace switching transistors $Q_{I2}$ have their gates connected in common and connected to the output of an OR gates $OR_{F2}$. The gate $OR_{H1}$, $OR_{H2}$, ... have their one input connected to output terminals of the horizontal scan circuit 31 where horizontal scan pulses $H_1$, $H_2$, ... are produced. The gates $OR_{V1}$, $OR_{V2}$, ... have their one input connected to output terminals of the vertical scan circuit 32 where vertical scan pulses $V_1$, $V_2$, ... are produced. The other input of the gates $OR_{H1}$, $OR_{H2}$, ... and $OR_{V1}$, $OR_{V2}$, ... is connected to an initialization terminal 33 (see FIG. 7) which will be described later.

Figure 4A:
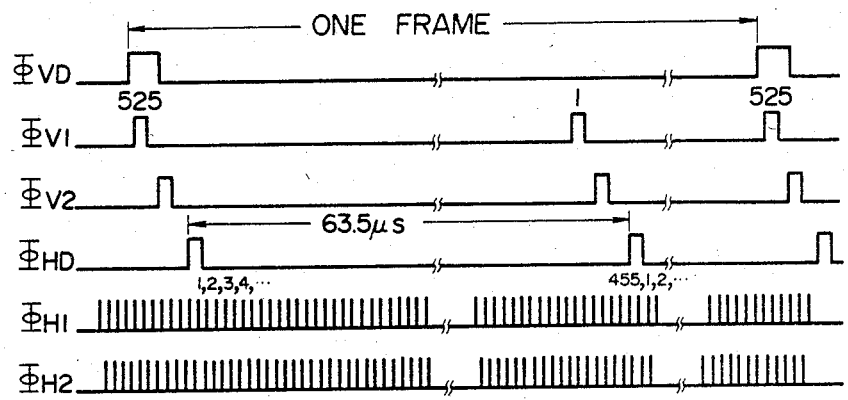
FIGS. 4A and 4B show series of waveforms of pulses which are used to drive the solid state pickup element shown in FIG. 3.
Figure 4B:
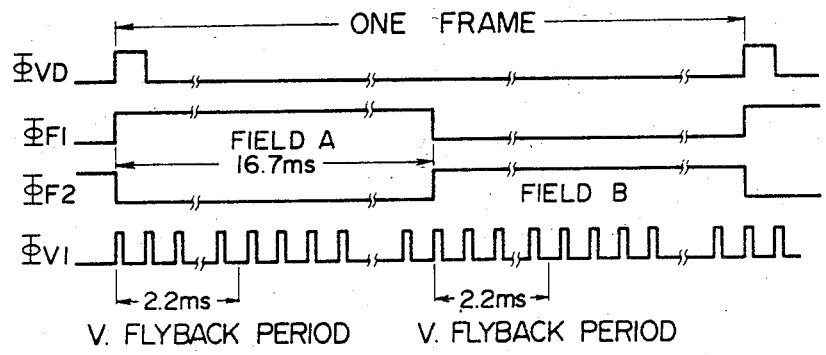

The horizontal scan circuit 31 is driven by a horizontal drive signal $\phi_{HD}$ of 15.73 kHz and a pair of horizontal clock pulses $\phi_{H1}$, $\phi_{H2}$ of 7.16 MHz, as shown in FIG. 4A, which are supplied by the drive pulse generator 6. The vertical scan circuit 32 is driven by a vertical drive signal $\phi_{VD}$ of 30 Hz and a pair of vertical clock pulses $\phi_{V1}$, $\phi_{V2}$ of 15.73 kHz, as shown in FIG. 4A, which are supplied from the drive pulse generator 6. The drive pulse generator 6 also produces field changing signals $\phi_{F1}$, $\phi_{F2}$ of 30 Hz, as shown in FIG. 4B, which are fed to one input of each of the gates $OR_{F1}$, $OR_{F2}$, the other input of which is connected to the initialization terminal 33. It will be noted that the drive pulse generator 6 is connected with the sync signal generator 21.

Considering the operation of the MOS pickup element constructed in the manner mentioned above, the vertical scan circuit 32 sequentially delivers the vertical scan pulses $V_1$, $V_2$, ... with a period corresponding to the frequency of 15.73 kHz. The field changing signals $\phi_{F1}$, $\phi_{F2}$ alternate between a high (hereafter referred to as "H") and a low (hereafter referred to as "L") level for every other field. During the first field in which the signal $\phi_{F1}$ assumes its "H" level, the transistor $Q_{I1}$ is turned on to deliver the scan pulses $V_1$, $V_2$, ... to the vertical column select lines ($L_{V1}$, $L_{V2}$), ($L_{V3}$, $L_{V4}$), ... in a sequential manner. During the second field in which the signal $\phi_{F2}$ assumes its "H" level, the transistor $Q_{I2}$ is turned on to deliver the scan pulses $V_1$, $V_2$, ... to the vertical column select lines ($L_{V2}$, $L_{V3}$), ($L_{V4}$, $L_{V5}$), ... in a sequential manner. In the meantime, the horizontal scan circuit 31 sequentially delivers horizontal scan pulses $H_1$, $H_2$, ... $H_{192}$ with a period corresponding to 7.16 MHz which is determined by the number of picture elements (which is equal to 384).

Accordingly, during the first field, the vertical scan pulse $V_1$ passes through the gate $OR_{V1}$, and as the horizontal scan pulses $H_1$, $H_2$, ... are sequentially delivered from the gates $OR_{H1}$, $OR_{H2}$, ..., picture elements are selected in a sequence of {(1, 1), (2, 1)}, {(1, 2), (2, 2)}, ... {(1, 384), (2, 384)}. Then the gate $OR_{V2}$ delivers the vertical scan pulse $V_2$, and at this time, as the horizontal scan pulses $H_1$, $H_2$, ... are delivered from the gates $OR_{H1}$, $OR_{H2}$, ..., picture elements are selected in a sequence of {(3, 1), (4, 1)}, {(3, 2), (4, 2)}, ... {(3, 384), (4, 384)}. Thus, the pair of trains of vertical and horizontal scan pulses cause picture elements to be selected in a sequence of {(1, 1), (2, 1)}, ... {(483, 384), (484, 384)} during the first field, followed by a scanning of the second field.

During the second field, the gate $OR_{V1}$ delivers the vertical scan pulse $V_1$, and as the horizontal scan pulses $H_1$, $H_2$, ... are sequentially delivered from the gates $OR_{H1}$, $OR_{H2}$, ..., picture elements are selected in the sequence of {(2, 1), (3, 1)}, {(2, 2), (3, 2)}, ... {(2, 384), (3, 384)}. The gate $OR_{V2}$ then delivers the vertical scan pulse $V_2$, and at this time, picture elements are selected in a sequence of {(3, 1), (5, 1)}, {(4, 2), (5, 2)}, ... {(4, 384), (5, 384)} as the horizontal scan pulses $H_1$, $H_2$, ... are sequentially delivered from the gates $OR_{H1}$, $OR_{H2}$, ... Thus, picture elements are selected in a sequence of {(2, 1), (3, 1)}, {(482, 384), (483, 384)}.

The vertical and the horizontal scanning during the first field (referred to as field A) and the second field (referred to as field B) complete a scanning of one frame. As a result of such selective scan of picture elements of the pickup element 1, green (G), red (R) and blue (B) color signals are developed at the pair of output terminals $O_1$, $O_2$. Such color signals are in the form of charges discharged in accordance with the amount of light impinging on the picture elements from an object being photographed. Such charge can be detected as a picture signal by either (1) a technique which detects a peak current which flows when charging the discharged charge, or (2) a technique to integrate a charging current over a period during which a particular picture element is scanned. In the pickup element 1 of the invention, the technique (1) is employed. The charge sensed represents an amount of charge which is discharged over a time interval from a selection of a particular photodiode PD until that photodiode is selected for the next time. Since the charge is read out in a time sequence even though the discharge interval remains constant for each photodiode, a special sophistication is required when taking a picture with a light source such as flashlight from an electronic flash.

Figure 5:
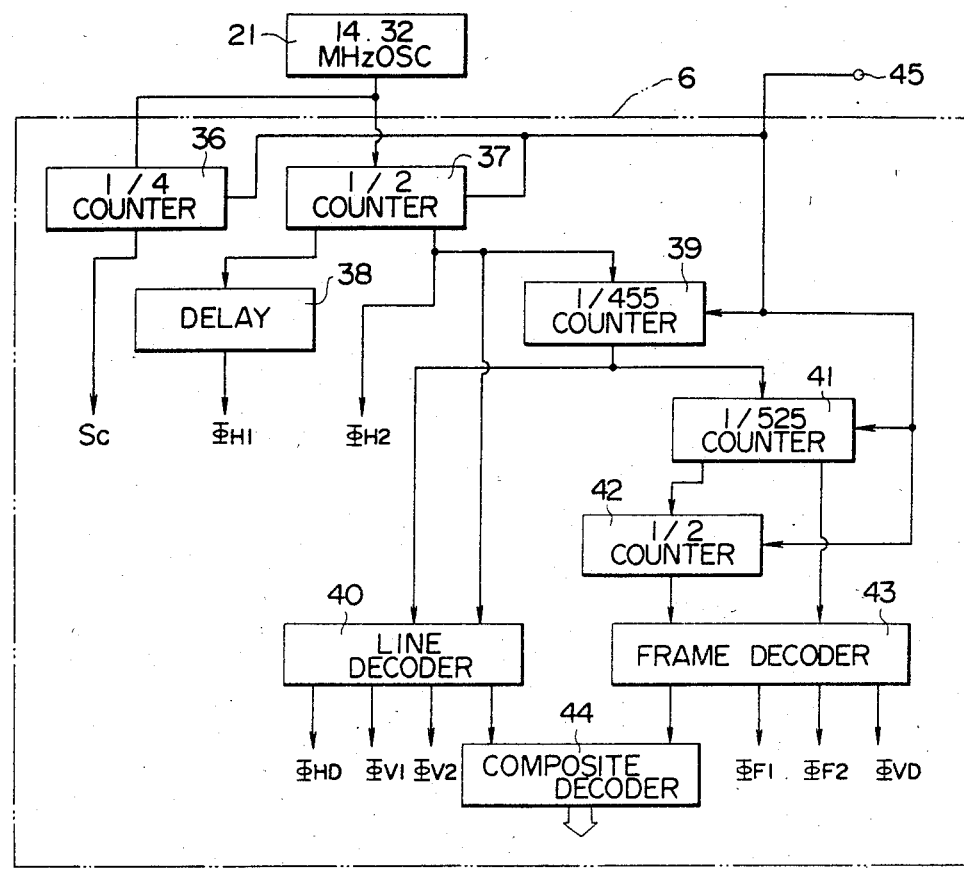
FIG. 5 is a block diagram of a drive pulse generator shown in FIG. 3.
Figure 6:
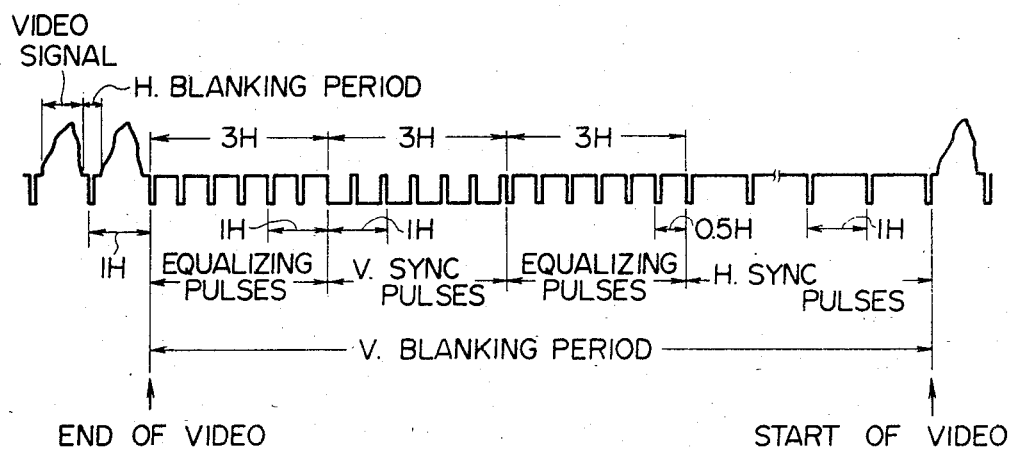
FIG. 6 shows the waveform of pulses which are produced by a composite decoder shown in FIG. 5.

Referring to FIG. 5, there are shown the drive pulse generator 6 and the sync signal generator 21 in block form. The sync signal generator 21 comprises an oscillator producing a fundamental frequency of 14.32 MHz. An output from the oscillator is fed to a divide-by-four counter 36 and a divide-by-two counter 37, both contained within the drive pulse generator 6, thus deriving frequency signals of 3.58 MHz and 7.16 MHz, respectively. The frequency signal of 3.58 MHz is used as the color sync signal Sc while the frequency signal of 7.16 MHz is directly utilized as the horizontal clock pulse $\phi_{H2}$ and is also used as the horizontal clock pulse $\phi_{H1}$ after passing through a delay circuit 38. It will be seen that the frequency signal of 7.16 MHz is also fed to a divide-by-455 counter 39 and a line decoder 40. The counter 39 derives a signal of 15.73 kHz, which is then fed to the line decoder 40 and to a divide-by-525 counter 41. The line decoder 40 delivers the vertical clock pulses $\phi_{V1}$, $\phi_{V2}$ of 15.73 kHz and the horizontal drive signal $\phi_{HD}$. The counter 41 derives a signal of 30 Hz, which is directly applied to a frame decoder 43 and is also fed through a divide-by-two counter 42 to the same decoder 43. This permits the frame decoder 43 to derive the field changing signals $\phi_{F1}$, $\phi_{F2}$ of 30 Hz and the vertical drive signal $\phi_{VD}$. Outputs from the line decoder 40 and the frame decoder 43 are fed to a composite decoder 44, which develops various pulses of a composite video signal other than a video signal, namely, vertical sync pulses, horizontal sync pulses and equalizing pulses. As is well recognized, equalizing pulses are inserted, with a period of 0.5 H (where H represents a horizontal scan period), before and after the vertical sync signals to prevent a failure of an interlaced scanning as a result of the vertical sync signals during an odd-numbered field (field A) which are phase displaced from those occurring during an even-numbered field (field B).

It will be noted in FIG. 5 that the individual counters 36, 37, 39, 41 and 42 of the drive pulse generator 6 have a reset terminal which is connected to a reset terminal 45 (see FIG. 7) to which a reset signal of "H" level is applied.

Figure 7:
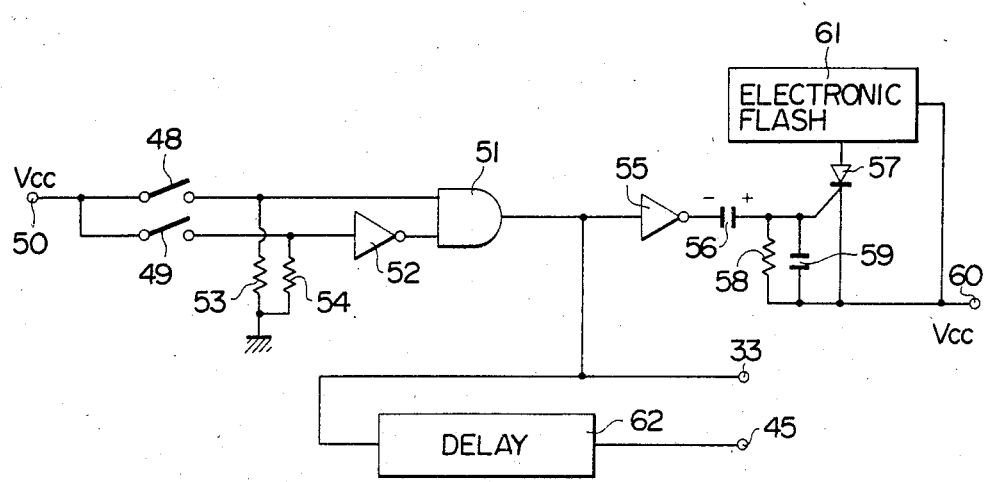
FIG. 7 is a circuit diagram of an emission controller for an electronic flash according to one embodiment of the invention.

FIG. 7 is a circuit diagram of an emission controller for an electronic flash according to one embodiment of the invention. A flash photography mode switch 48 is closed whenever a flash photography mode is selected, and an emission initiate switch 49 is mechanically interlocked with a release button for initiating the emission of flashlight from an electronic flash. One end of each of these switches is connected to a terminal 50, to which a supply voltage Vcc is applied. The other end of the switch 48 is connected to one input of an AND gate 51, the other input of which is connected to the other end of the emission initiate switch 49 through an inverter 52. The one input of the gate 51 is connected to the ground through a resistor 53, and the input of the inverter 52 is connected to the ground through a resistor 54. The output of the gate 51 is connected through an inverter 55 to one end of an emission trigger capacitor 56, the other end of which is connected to the gate of a thyristor 57. A parallel combination of resistor 58 and capacitor 59 is connected across the gate and the cathode of the thyristor 57, with the cathode being connected to a terminal 60, to which the supply voltage Vcc is applied. It will be seen that the terminal 60 and the anode of the thyristor 57 are connected across an electronic flash 61.

The output of the gate 51 is also connected to the initialization terminal 33 shown in FIG. 3 and also connected to a delay circuit 62 comprising a D-type flipflop which operates to delay the trailing edge when the output from the gate 51 changes from its "H" to its "L" level. The output of the delay circuit 62 is connected to the reset terminal 45 shown in FIG. 5.

Figure 8:
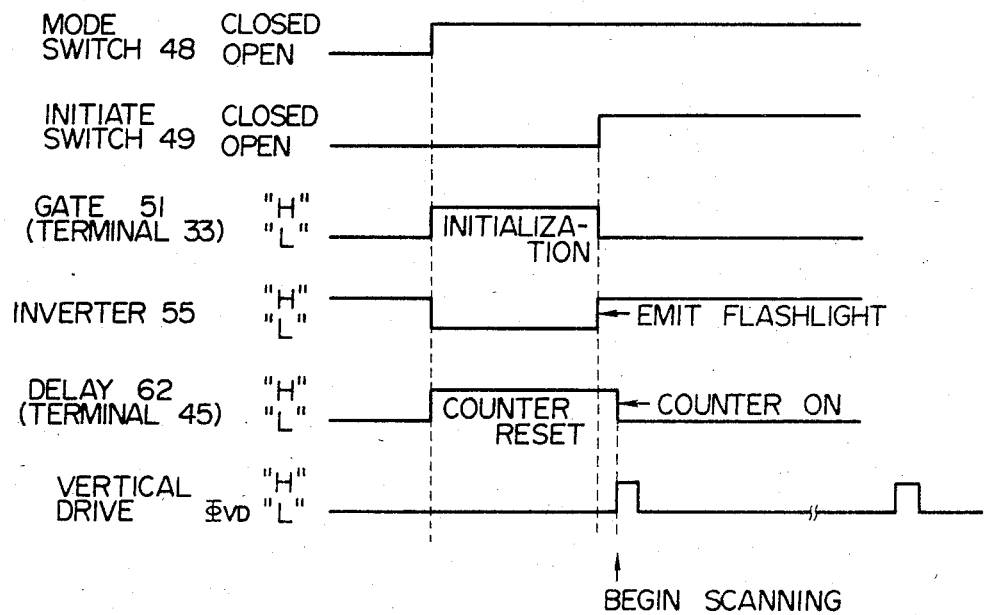
FIG. 8 is a series of timing charts illustrating signals appearing at various points in the emission controller shown in FIG. 7.

The operation of the emission controller will now be described with reference to a timing chart shown in FIG. 8. As shown in FIG. 7, the mode switch 48 and the emission initiate switch 49 are normally open, and accordingly the gate 51 produces an output of "L" level. Thus, the capacitor 56 is not charged, and both the initialization terminal 33 and the reset terminal 45 assume "L" level. When performing a flash photography, the mode switch 48 is initially closed, whereupon the both inputs to the gate 51 are at "H" level, so that the gate produces an output of "H" level. This causes the inverter 55 to produce an output of "L" level, allowing the capacitor 56 to be charged to the supply voltage Vcc with a polarity as shown, with the thyristor 57 remaining off. Since the initialization terminal 33 assumes its "H" level, all the gates $OR_{H1}$, $OR_{H2}$, ... $OR_{V1}$, $OR_{V2}$, ... as well as $OR_{F1}$, $OR_{F2}$ (see FIG. 3) produce outputs of "H" level, whereby the horizontal switching transistors $Q_{H1}$, $Q_{H2}$, the vertical switching transistor $Q_V$ and the interlace switching transistors $Q_{I1}$, $Q_{I2}$ are all turned on. This means that all the photodiodes PD corresponding to 484×384 picture elements are selected, which means that the capacitance of every photodiode PD is charged to the potential of the target source Es, thus achieving the initialization.

When the output from the gate 51 first changes to its "H" level, the delay circuit 62 produces an output of "H" level, whereby the counters 36, 37, 39, 41 and 42 shown in FIG. 5 are all reset. Thus, when the flash photography mode is selected and an electronic flash is going to be triggered, all the counters are reset, producing outputs of "L" level. Accordingly, the line decoder 40, the frame decoder 43 and the composite decoder 44 all produce outputs of "L" level, and hence the drive pulse generator 6 does not deliver pulses to the horizontal and the vertical scan circuits 31, 32.

When the emission initiate switch 49 is closed under the condition that all the picture elements of the pickup element have been initialized, the inverter 52 produces an output of "L" level, whereby the gate 51 produces an output of "L" level. Thereupon, the initialization terminal 33 assumes "L" level causing the gates $OR_{H1}$, $OR_{H2}$, ..., $OR_{V1}$, $OR_{V2}$, ... and $OR_{F1}$, $OR_{F2}$ associated with the pickup element 1 to produce outputs of "L" level. Accordingly, the horizontal switching transistors $Q_{H1}$, $Q_{H2}$, the vertical switching transistor $Q_V$ and the interlace switching transistors $Q_{I1}$, $Q_{I2}$ are all turned off, resetting the initialized condition of all the picture elements. The "L" level output from the gate 51 causes the inverter 55 to produce an output of "H" level, whereby the charge on the capacitor 56 discharges through the gate of the thyristor 57, thus turning it on. A flash tube within the electronic flash 61 then initiates its emission. The flashlight emitted by the electronic flash 61 is reflected by an object being photographed and passes through the taking lens to impinge upon the light receiving surface of the MOS pickup element 1, whereby the charge on each photodiode PD corresponding to each picture element begins to discharge in accordance with the intensity of incident light. After a time interval of about 2 msec (which begins with the emission of flashlight from the electronic flash and ends with the termination of the flash emission) passes, the output from the delay circuit 62 changes to its "L" level, whereby the reset terminal 45 assumes its "L" level, allowing the counters 36, 37, 39, 41 and 42 within the drive pulse generator 6 to begin their counting operation. As these counters begin to operate, the decoders 40, 43 and 44 begin to produce various pulses as illustrated in FIGS. 4A and 4B in order to begin a scanning, starting from the first field. Accordingly, in response to the vertical drive signal $\phi_{VD}$ fed to the vertical scan circuit 32, a scanning of one frame of the pickup element 1 is initiated. Subsequently, the MOS pickup element 1 is scanned in a sequential manner, starting from the picture element which is located on the upper, left-hand corner thereof, in response to the vertical scan pulses $V_1, V_2, \ldots$ from the vertical scan circuit 32 and the horizontal scan pulses $H_1, H_2, \ldots$ from the horizontal scan circuit 31, thus reading out a picture signal which corresponds to the incident light from an object being photographed which is illuminated by the flashlight from the electronic flash.

It will be seen from the foregoing description that the emission of flashlight from the electronic flash occurs simultaneously with the closure of the emission initiate switch 49, and the pickup element 1 forcibly begins to be scanned, starting from the picture element located at the upper left-hand corner thereof, immediately after the termination of the emission of flash light (in practice, the scanning begins after the vertical flyback period during the vertical scan and after the horizontal flyback period during the horizontal scan). This avoids the failure to produce a synchronized image as a result of the initiation of the emission of flashlight from the electronic flash in the course of scanning or a time delay in initiating the emission which is caused until the scanning returns to the picture element located at the upper, left-hand corner.

As an alternative arrangement, the mode switch 48 and the emission initiate switch 49 may be mechanically interlocked with each other so that the switch 49 is closed with a given time delay with respect to the closure of the switch 48.

As a further alternative, the emission initiate switch 49 may be replaced by an electronic switch such as an infrared radiation switch, in order to facilitate high speed flash photography of the mode of life of animals.

As discussed above, in accordance with the invention, the photodiodes corresponding to all the picture elements which constitute together the pickup element are initialized and then reset by an emission initiate signal, and a scanning of the pickup element is reliably initiated at a given time interval after the emission of flashlight from the electronic flash. As a result, it is possible to take a still picture of an object being photographed, which moves momentarily, in a reliable manner, with a simple and inexpensive arrangement.

What is claimed is:

1. An emission controller for an electronic flash associated with an electronic camera which includes both a solid pickup element having individual photoelectric transducer elements which define picture elements of the solid state pickup element, and means for normally repeatedly scanning the transducer element in a predetermined timing sequence; said emission controller comprising:
    (a) means for disabling the scanning means and initializing the individual photoelectric transducer elements by placing each of said transducer elements at a common charge level, prior to the emission of flash light from said electronic flash;
    (b) means for resetting the transducer elements in substantially simultaneous synchronized relationship with the emission of flash light from the electronic flash so as to permit the charge level of each individual transducer element to change as function of the amount of light from the electronic flash impinging on that transducer element; and
    (c) means for enabling the scanning means so as to initiate a sequential scanning of the transducer element at a given time delay after the emission of flash light from the electronic flash.

2. An emission controller according to claim 1 in which the initializing means includes a flash photography mode switch, the solid state pickup element being associated with a scan circuit having control switching elements connected on its output side for scanning the transducer elements of the pickup element, all of the control switching elements being turned on in synchronism with the operation of the mode switch.

3. An emission controller according to claim 2 in which the mode switch operates to charge a capacitor in synchronism therewith, which capacitor is used to trigger the emission of flashlight from an electronic flash.

4. An emission controller according to claim 2 in which the reset means includes an emission initiate switch, the solid state pickup element being associated with a scan circuit having control switching elements connected to its output side for scanning the transducer elements of the pickup element, all of the control switching elements being turned on in synchronism with the operation of the mode switch and being turned off in synchronism with the operation of the emission initiate switch.

5. An emission controller according to claim 4 in which the emission initiate switch is mechanically interlocked with a shutter release button of a camera, the operation of the mode switch causing a capacitor to be charged which is used to trigger the emission of flashlight from the electronic flash, the operation of the emission initiate switch causing the capacitor to discharge, thereby initiating the emission of flashlight from the electronic flash.

6. An emission controller according to claim 1 in which the means for initiating a sequential scanning includes a delay circuit for delaying by a given time interval a signal produced by an emission initiate switch which is contained within the reset means for initiating the emission of flashlight from an electronic flash, and a drive pulse generator reset by a flash photography mode switch contained within the initializing means and enabled by an output from the delay circuit for driving a scan circuit associated with the solid state pickup element.

7. An emission controller for an electronic flash associated with an electronic camera which includes a solid state pickup element; said emission controller comprising:
means for initializing individual photoelectric transducer elements which define picture elements of the solid state state pickup element, prior to the emission of flash light from an electronic flash; said initializing means including a flash photography mode switch; said solid state pick up element being associated with a scan circuit having control switching elements connected on its output side for scanning said transducer elements of said pickup element, all of said control switching elements being turned on in synchronism with the operation of said mode switch;
means for resetting said transducer elements in synchronized relationship with the emission of flash light from said electronic flash; and
means for initiating a sequential scanning of said transducer elements at a given time delay after the initiation of emission of flashlight from said electronic flash.

8. An emission controller according to claim 7 in which the mode switch operates to charge a capacitor in synchronism therewith, which capacitor is used to trigger the emission of flashlight from an electronic flash.

9. An emission controller according to claim 7 in which the reset means includes an emission initiate switch, the solid state pickup element being associated with a scan circuit having control switching elements connected to its output side for scanning the transducer elements of the pickup element, all of the control switching elements being turned on in synchronism with the operation of the mode switch and being turned off in synchronism with the operation of the emission initiate switch.

10. An emission controller according to claim 7 in which the emission initiate switch is mechanically interlocked with a shutter release button of a camera, the operation of the mode switch causing a capacitor to be charged which is used to trigger the emission of flashlight from the electronic flash, the operation of the emission initiate switch causing the capacitor to discharge, thereby initiating the emission of flashlight from the electronic flash.

11. An emission controller for an electronic flash associated with an electronic camera which includes a solid state pickup element, said emission controller comprising:
means for initializing individual photoelectric transducer elements which define picture elements of the solid state pickup element, prior to the emission of flashlight from an electronic flash;
means for resetting the transducer elements in synchronized relationship with the emission of flashlight from said electronic flash;
means for initiating a sequential scanning of said transducer elements at a given time delay after initiation of emission of flashlight from said electronic flash, said means for initiating a sequential scanning including a delay circuit for delaying by a given time interval a signal produced by an emission initiate switch which is contained within said resetting means for initiating the emission of flashlight from an electronic flash, and a drive pulse generator reset by a flash photography mode switch contained within the initializing means and enabled by an output from said delay circuit for driving a scan circuit associated with said solid state pickup element.

12. An emission controller as in claim 1, wherein said disabling of the scanning means and initialization of the transducer elements are substantially simultaneous.

13. An emission controller as in claim 1, wherein said given time delay for enabling of the scanning means after the emission of flash light is selected to enable the scanning after said flash light emission has been substantially completed.

14. An emission controller as in claim 1, wherein said means for disabling the scanning means includes flash photography mode selection means which disables said scanning means and substantially simultaneously prepares such electronic flash for flash light emission.

15. An emission controller as in claim 1, wherein said means for disabling said scanning means includes a flash photography mode selection switch, and said means disables said scanning means in substantially simultaneous synchronization with the operation of said mode selection switch.

16. An emission controller as in claim 1, wherein said mode selection switch substantially simultaneously disables said scanning means and prepares such electronic flash for flash light emission.

* * * * *